Figure 1:
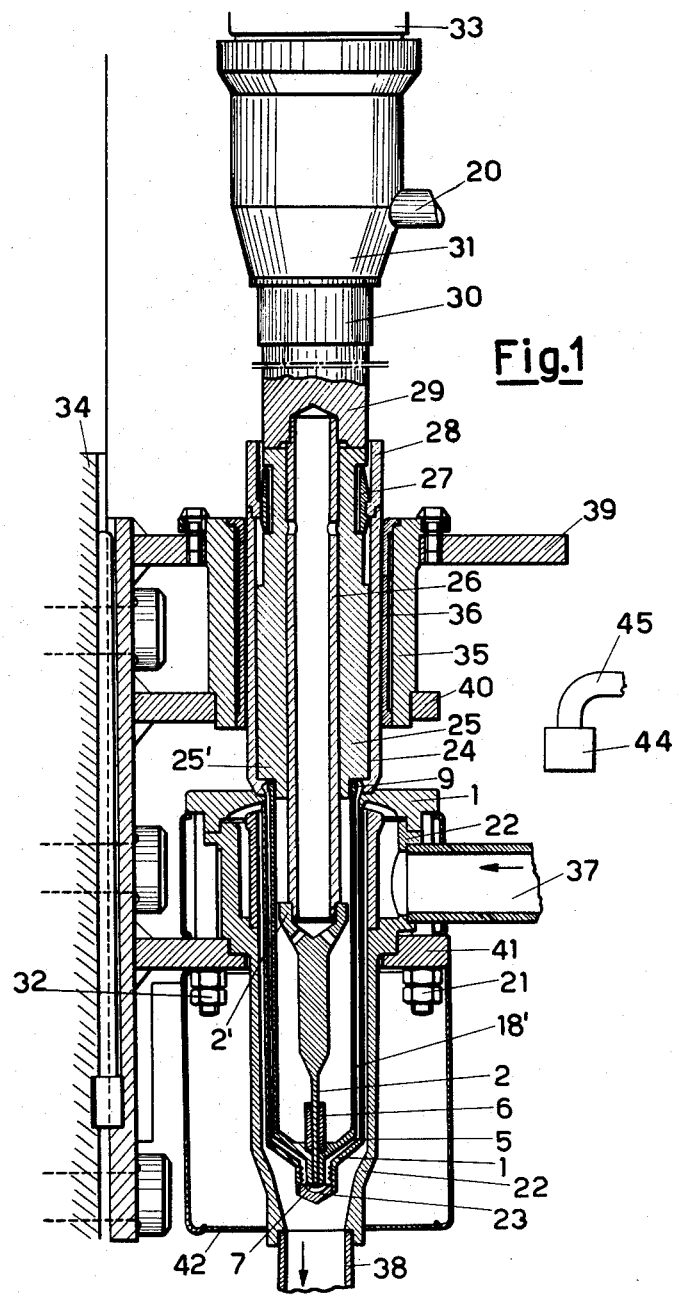

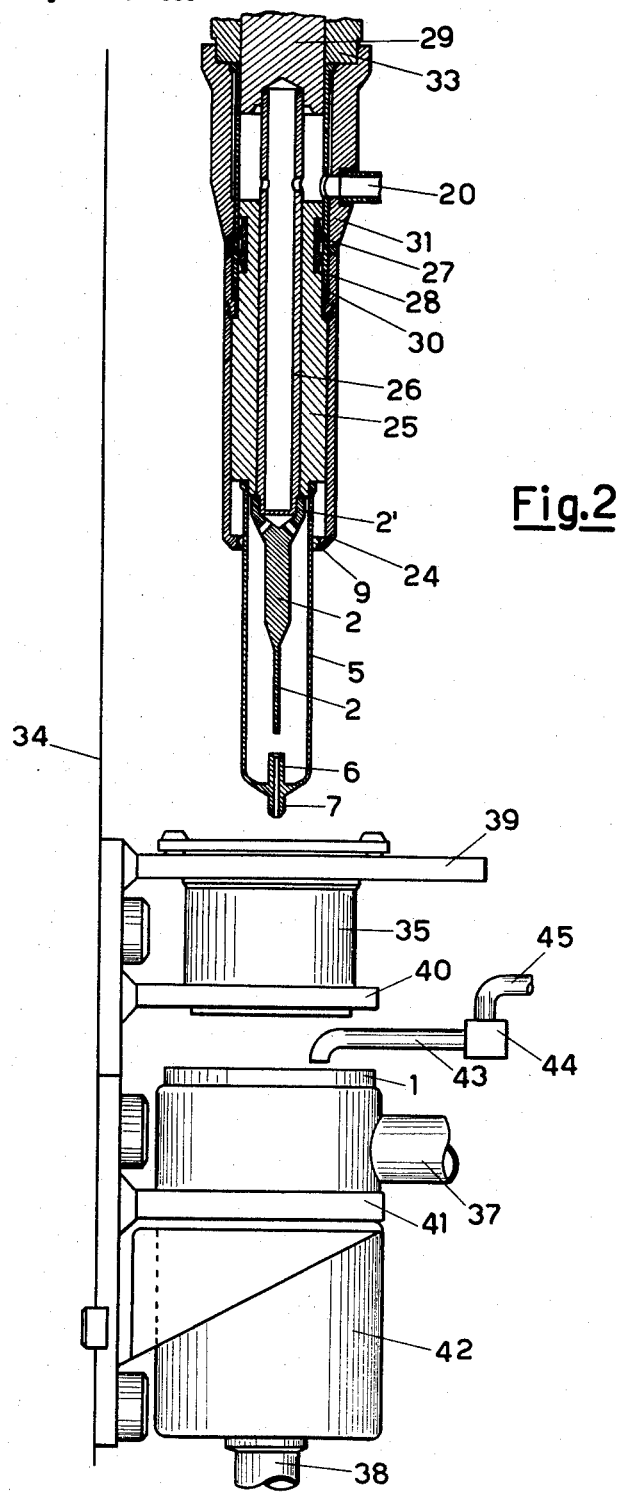

United States Patent Office 2,903,746
Patented Sept. 15, 1959

2,903,746

APPARATUS FOR MOLDING TUBES

Eugène Duhamel, Colmar, and Aimée Stephan, Grenoble, France, assignors to Societe Nouvelle Baele-Gangloff, Villeurbanne (Rhone), France, a company of France Application September 29, 1953, Serial No. 383,044

Claims priority, application France October 2, 1952

3 Claims. (Cl. 18—26)

The present invention relates to apparatus for molding tubes of thermoplastic material.

It is known to form tubes, such as, tooth paste tubes and the like, entirely of plastics which have a comparatively thick head with a threaded neck united by welding with a body having thinner walls. This involves a number of manufacturing operations, which is very burdensome and as a consequence these plastic tubes cannot compete economically with metal tubes.

It is an object of the present invention to provide an apparatus for manufacturing a tubular case of a single piece of plastics and in a single molding operation so as to simplify the manufacturing procedure and thereby produce a cheap article.

Another object of the invention is to provide apparatus of the described character including a mold having an upwardly opening, vertical mold cavity corresponding in length and cross-section to the external contour of the tube to be molded, and a vertical hollow core formed to extend into the mold cavity with a clearance therebetween corresponding to the thickness of the tube to be formed so that, following the deposit of a quantity of plastic material in the cavity, downward movement of the core into the cavity causes the plastic material to rise in the clearance, and wherein means are provided for ensuring the upward removal of the molded tube from the mold cavity upon upward withdrawal of the core and thereafter facilitating the stripping of the molded tube from the core.

In accordance with an aspect of the invention, the upper end portion of the vertically movable core has an enlarged outer diameter and projects out of the mold cavity when the core is fully extended into the latter, while a hollow vertical sleeve movable axially relative to the core and mold has a lower end formed to seat on the mold around the enlarged diameter upper end portion of the core for closing the mold cavity, with the lower end of the sleeve having an annular channel in its inner surface communicating with the clearance between the core and mold cavity so that a bead is formed at the upper end of the molded tube in the channel around the upper end portion of the core, such bead being held in the channel to ensure removal of the tube with the core from the mold cavity during simultaneous upward movement of the core and sleeve. Thereafter, the core is moved upwardly relative to the sleeve so that the channel of the latter is then disposed below the enlarged diameter upper end portion of the core to permit radially inward springing of the bead of the molded tube for removal from the channel during downward stripping of the molded tube from the core.

The above, and other objects, features and advantages of the invention, will be apparent in the following detailed description of illustrative embodiments thereof which is to be read in connection with the accompanying drawings forming a part hereof, and wherein:

Fig. 1 is an elevational view, partly broken away and in axial section, of a molding apparatus embodying the present invention and shown in its closed condition; and Fig. 2 is a view similar to that of Fig. 1, but showing the apparatus in its open condition.

Referring to the drawings in detail, it should be noted that a machine or apparatus embodying the present invention may be made up of a number of molding units, and that the drawings merely show one of those molding units.

Each molding unit includes a mold 1 which is secured to a casing 22 while the latter is fixed to a bracket 41 by means of nuts and bolts 21 and 32. The bracket 41 is secured to a suitable rigid support 34, as by welding. The mold 1 is preferably thin walled and formed of steel, and defines an upwardly opening, vertical mold cavity corresponding in length and cross-section to the external contour of the tube to be molded. The lower end of mold 1 has an internally threaded neck corresponding to the threaded neck to be formed on a plastic tube and closed by a stopper 23 which is screwed into the threaded neck of the mold and welded in place.

A vertical hollow steel core 5 is formed to extend into the cavity of mold 1 with a clearance 18' therebetween corresponding to the thickness of the tube to be formed so that, following the deposit of a quantity of plastic material in the cavity of mold 1, vertically downward movement of the core 5 into the mold cavity causes the plastic material to rise in the clearance 18'.

The upper end of hollow core 5 is screwed onto, or otherwise secured to the lower end of a cast iron tubular member 25, and a hardened steel sleeve 24 is axially slidable on tubular member 25 and is, in turn, axially guided by a bronze bearing sleeve 36 mounted within a tubular bearing member 35 which is fixed to the support 34 of the machine by means of brackets 39 and 40. Thus, the bearing structure 35, 36, the sleeve 24 and the tubular member 25 serve to axially guide core 5 during its vertical movement in order to ensure the maintenance of the annular clearance 18' between the core and the interior surface of mold 1.

The lower end of core 5 is formed with an air inlet 7 which is axially aligned with a bushing 6 mounted within the lower part of the core, and a valve needle 2 is adapted to extend axially through the bushing 6 and into the opening 7 for closing the latter.

The valve needle 2 has a hollow upper portion 2' which is suitably fixed on the lower end of a hollow stem 26 axially slidable within tubular member 25. The upper end of stem 26 is screwed into the stem or piston rod 29 of a double acting hydraulic jack 33 which is suitably secured to the support 34.

As is clear in Figs. 1 and 2, the upper end of core 5 has an enlarged outer diameter, while the lower end of sleeve 24 is turned radially inward, and is formed with a radially inwardly opening annular channel 9, for a purpose hereinafter described in detail.

Further, the upper end portion of tubular member 25 has an external, radially outwardly opening groove or channel accommodating an elastic ring 27, while an extension 28 is secured to the upper end of sleeve 24 and is formed with an inwardly directed annular rim adapted to engage in an outwardly opening annular groove in the elastic ring 27 when the latter is in its normally expanded condition so that the sleeve 24 is then movable upwardly with the tubular member 25. However, a tubular release member 30 depends from the body of jack 33 and, at the top of the upward stroke of the piston rod 29 is adapted to enter between tubular member 25 and extension 28 and to act against the tapering outer surface of elastic ring 27 in order to radially contract the latter and thereby effect its disengagement from the extension 28 of sleeve 24.

It will be seen that the casing 22 defines an annular space around the outside of mold 1 and is provided with an inlet conduit 37 at its top and an outlet conduit 38 at its bottom so that a heating fluid or a cooling fluid can be circulated from conduit 37 to conduit 38 through the annular space around the mold. Further, a protective housing 42 may extend around the mold 1 and its casing 22.

Referring to Fig. 2, it will also be seen that an inlet conduit 20 for compressed air opens into a hollow downward extension 31 of the body of jack 30, and that the upper end portion of the hollow stem 26 is provided with radial openings for receiving the compressed air when such radial openings are disposed above the upper end of tubular member 25, as in Fig. 2, so that the compressed air is then transmitted through hollow stem 26 and openings in the upper portion of valve needle 2 into the interior of core 5 in order to act through the opening 7 of the latter in stripping a molded tube from the core in the manner hereinafter described in detail.

A paste injector 44 (Fig. 2) is provided with a rotary arm 43 and is in communication through the pipe 45 with a measuring or dosing device for the paste (not shown) and serves to deposit into the mold 1 the exact quantity of paste necessary for the manufacture of a tubular case.

With the mold in the closed position (Fig. 1), the stem 29 of the piston of the jack 33 bears downwards against the tubular member 25 which rests, at its step or shoulder 25', on the sleeve 24. The sleeve 24, in engaging the mold 1, seals it hermetically.

The paste which has been previously deposed in the bottom of the mold is driven upwardly by the core 5 and fills the whole space defined between the mold 1, the core 5 and the lower end of sleeve 24.

During opening of the mold, the stem 29 of the piston of the jack 33 rises and initially takes along only the stem 26 and the needle 2, thus opening the air inlet 7. Thereafter, during further upward movement of the stem 29, the extension 2' of the needle 2 abuts against the lower end of tubular member 25 and drags it along together with the core 5, the sleeve 24 and the molded article. The annular channel or groove 9 formed in the lower end of the sleeve 24 and which communicates with the molding cavity, causes a bead to be formed on the upper edge of the tube, and the engagement of this head in channel 9 forces the molded tube to remain on the core 5 during extraction.

In open position (Fig. 2), when the stem of the piston of the jack is a short distance, for example, three centimetres from the end of its stroke, the fixed tubular member 30 rigid with the jack 33 comes in contact with the split elastic ring 27 and radially contracts the latter.

This ring 27 had ensured that, during rising of the stem 29, the sleeve 24 is taken along, and contraction of the ring 27 releases the sleeve 24. The sleeve 24, through the extension 28 attached to it, then abuts against the stationary part 31 and becomes motionless, while core 5 and tubular member 25 continue to move upwardly through a distance of several centimeters. During such further movement the conduit 20 for the compressed air is in communication with the interior of the core 5, so that air enters the core and the molded tube for stripping the latter from the core; the core 5 and the sleeve 24 being axially displaced relative to each other, the bead molded on the tube is free to disengage from channel 9 and is pushed downwards at the same time by the compressed air for stripping article from the core 5.

During closing of the mold, the stem 29 of the piston moves downwardly, taking along with it all the moving parts. These assume the initial positions described hereinbefore, since the friction of the bearing 36 obliges sleeve 24 and tubular member 25 to slide upwards relative to the hollow stem 26.

Heating and cooling are obtained by circulating the heating or cooling fluid within annular space between the mold 1 and the casing 22.

A set of distributor valves (not shown) actuated in a synchronous manner by a control cam put this annular space between casing 22 and mold 1 alternately in communication with a source of hot fluid and with a source of cold fluid. Heating begins as soon as the piston is lowered, and is followed by a cooling period which encompasses the time necessary to obtain the temperature required for extracting the molded tube from the mold, plus all the time during which the mold is open.

Having described the essential elements constituting the automatic apparatus according to the invention for obtaining a one piece, completely finished tube in a single molding operation it will be understood that filling of the tube will be accomplished with the aid of known means, prior to sealing of the tube by high frequency welding pincers or tongs.

What we claim is:

1. Apparatus for molding hollow tubes formed of thermoplastic material; said apparatus comprising a vertical support, a mold secured on said support and having an upwardly opening, vertical mold cavity corresponding in length and cross-section to the external contour of the tube to be molded and adapted to receive a thermoplastic material in pouring condition through the open upper end thereof and in a quantity sufficient to form a tube to be molded, a vertical hollow core formed to extend into said mold cavity with a clearance between the mold cavity and said core corresponding to the thickness of the tube to be formed so that, following the deposit of a quantity of plastic material in said cavity, downward movement of said core into said cavity causes the plastic material to rise in said clearance, the upper end portion of said core having an enlarged outer diameter and projecting out of said mold cavity when the core is fully extended into the latter, a hollow vertical sleeve movable axially relative to said core and mold and having a lower end formed to seat on said mold around said enlarged diameter upper end portion of the core for closing said mold cavity, said lower end of the sleeve having an annular channel in its inner surface communicating with said clearance so that a bead is formed at the upper end of the molded tube in said channel around said upper end portion of the core, means for heating and then cooling said mold after the insertion of said core into the mold cavity thereby to set the plastic material forming a tube around the core, and means operative to simultaneously move said core and sleeve vertically upward relative to said mold so that the bead at the upper end of the molded tube is held in said channel to ensure removal of the tube with the core from said mold cavity, and then to effect upward movement of said core relative to said sleeve so that said channel of the latter is then disposed below said enlarged diameter upper end portion of the core to permit radially inward springing of the bead of the molded tube for removal from said channel during downward stripping of the molded tube from said core.

2. Apparatus as in claim 1; wherein said core has an aperture at the lower end thereof; and further comprising a needle member movable vertically within said core to close said aperture before the lower end of said core contacts the plastic material in said cavity during the insertion of said core into the cavity and to withdraw from said aperture during removal of said core from the mold cavity, and means for supplying a fluid under pressure to the interior of said hollow core upon said upward movement of said core relative to said sleeve so that the fluid under pressure can then act through said aperture on the molded tube for effecting the downward stripping of the latter from said core.

3. Apparatus as in claim 2; further comprising a cylindrical bearing mounted on said support above said mold and concentric with said cavity of the latter, said sleeve being slidable in said bearing, and a hollow guide member slidable in said sleeve and secured, at its lower end, to the upper end of said core for guiding the latter relative to said cavity during insertion of said core into the latter; and wherein said means operative to move said core and sleeve includes a jack having a downwardly directed, vertically movable piston rod, a vertical extension of said needle member extending through said hollow guide member and connected, at its upper end, to said piston rod to move with the latter, said extension having an axial length greater than that of said hollow guide member and means defining axially facing shoulders at the opposite ends of said extension engageable with said hollow guide member to provide a lost motion connection between said hollow guide member and said piston rod, releasable coupling means between said sleeve and said hollow guide member, and means limiting the upward movement of said sleeve to cause disengagement of said coupling means and thereby permit said upward movement of said core relative to said sleeve.

References Cited in the file of this patent

UNITED STATES PATENTS

| | | |
|---|---|---|
| 1,966,877 | Witte | July 17, 1934 |
| 2,320,583 | Forro | June 1, 1943 |
| 2,469,130 | Rodman | May 3, 1949 |
| 2,473,722 | Nelson | June 21, 1949 |
| 2,483,376 | Temple | Sept. 27, 1949 |
| 2,514,486 | Green | July 11, 1950 |
| 2,525,880 | Feldman | Oct. 17, 1950 |
| 2,541,923 | Huxham | Feb. 13, 1951 |
| 2,642,920 | Simon et al. | June 23, 1953 |
| 2,799,049 | Wilson | July 16, 1957 |

FOREIGN PATENTS

| | | |
|---|---|---|
| 511,601 | Great Britain | Aug. 22, 1939 |